United States Patent [19]

Goldman et al.

[11] Patent Number: 4,820,556
[45] Date of Patent: Apr. 11, 1989

[54] DECORATIVE SHELF SYSTEM FOR AQUARIUM OR TERRARIUM

[75] Inventors: Jerome Goldman, New York; Marvin Goldman, Great Neck; Gerald Phillips, Glen Cove; Eric Sauerman, East Atlantic Beach, all of N.Y.

[73] Assignee: Penn Plax Plastics, Inc., Garden City, N.Y.

[21] Appl. No.: 56,301

[22] Filed: Jun. 1, 1987

Related U.S. Application Data

[63] Continuation of Ser. No. 743,179, Jun. 10, 1985, abandoned.

[51] Int. Cl.$^4$ .................. A47G 33/04; A01N 1/00; A01K 63/00; E04H 3/16
[52] U.S. Cl. .......................... 428/7; 428/11; 428/15; 119/5; 210/169
[58] Field of Search .............. 428/7, 11, 15; 119/5; 210/169

[56] References Cited

U.S. PATENT DOCUMENTS

| | | | |
|---|---|---|---|
| 3,141,442 | 7/1964 | Harris | 119/5 |
| 3,512,503 | 5/1970 | Willinger | 119/5 |
| 3,516,544 | 6/1970 | Sesholtz | 210/169 |
| 3,517,649 | 6/1970 | Holden | 119/5 |
| 3,562,952 | 2/1971 | Bramante | 47/44 |
| 4,133,024 | 1/1979 | Roehrick | 362/101 |
| 4,176,620 | 12/1979 | Kassos | 119/5 |
| 4,318,945 | 3/1982 | Goldman et al. | 428/15 |

FOREIGN PATENT DOCUMENTS

| | | |
|---|---|---|
| 1187419 | 2/1965 | Fed. Rep. of Germany . |
| 2416470 | 10/1975 | Fed. Rep. of Germany . |
| 2477804 | 9/1981 | France . |
| 7408464 | 12/1975 | Netherlands . |
| 198821 | 8/1967 | U.S.S.R. . |

Primary Examiner—Bruce H. Hess
Assistant Examiner—P. J. Ryan
Attorney, Agent, or Firm—R. Scott Goldman

[57] ABSTRACT

A shelf system which provides a decorative ornament for use inside of aquariums or terrariums. A rigid planar sheet is provided with a means for removable attachment to the inside surface of the wall of an aquarium at any height along the wall. The attachment means does not alter the ability of the wall to hold water in the aquarium while maintaining a secure attachment to the inner surface of the aquarium wall. The shelf may be provided with ornamentation, particularly a decorative texture on the outer edge and it may be provided with a supporting column.

19 Claims, 1 Drawing Sheet

DECORATIVE SHELF SYSTEM FOR AQUARIUM OR TERRARIUM

This application is a continuation of application Ser. No. 743,179 filed June 10, 1985, now abandoned.

BACKGROUND OF THE INVENTION

The present invention relates generally to a shelf system for use in aquariums or terrariums for decorative purposes. More particularly, the invention relates to a shelf which may be removably attached to the the inside wall of the aquarium in a secure fashion. The walls of the aquarium are conventionally made of a glass or plastic material and it is essential that the present invention maintain the integrity of the aquarium wall surface. In other words, the inventive shelf system must be able to be attached to the aquarium wall without altering the wall so that water may be maintained in the aquarium above the level of attachment.

Aquarium (hereinafter including terrarium) decoration and ornamentation conventionally is in the form of objects which have a based point for attachment or placement in the aquarium which is adapted for positioning at the bottom of the aquarium. Usually, gravel or rock material is used to keep the ornamentation in place. Popular aquarium ornamentation consists of natural structures such as rocks, driftwood, shells and plants. These are either in real or simulated form. Aquarium decoration may also take the form of representative ornamentation such as treasure chests, shipwrecks, divers and similar objects generally found or associated with under water locations. These forms of ornamentation are consistently made so that they remain at the bottom of the aquarium or fish tank.

It is common to fabricate ornamentation of sufficient height so that it extends upward toward to the top of the aquarium or so that it floats at the middle or top of the aquarium. Also, certain types of aquarium ornamentation, usually in the form of rock structures, are manufactured so that they may be assembled to extend upward into the upper areas of the aquarium. See for example, U.S. Pat. No. 4,318,945. However, these forms of ornamentation are attached to the aquarium by a base structure positioned at the bottom of the fish tank and usually held down by gravel. Further, an aquarium ornament has been marketed which consists of a skin diver which is cut in half and adapted so that it could be attached to the inner and outer glass surface of the aquarium in order to give the effect of either swimming into or out of the aquarium. This ornament is not attached to a base at the bottom of the aquarium, differing from conventional aquarium ornamentation.

SUMMARY OF THE INVENTION

It is the object of the present invention to provide a decorative shelf or terrace system which may be removably attached to the inside of the wall of an aquarium or terrarium at any point between the bottom and top of the fish tank. The primary point of attachment inside of the aquarium is the inner surface of the wall of the aquarium and not the bottom of the aquarium. The shelf may be placed in a corner of the aquarium so that two surfaces contact the aquarium wall, or it may be placed in the aquarium so that only one surface contacts the aquarium wall. The shelf may be formed so that it is reversible, and may fit in either corner of the aquarium. Further, the shelf may be formed in a variety of sizes which are suitable for use in conventionally sized aquariums. Generally the shelf should be in the range of 3 to 36 inches in length and 3 to 24 inches in width. Shelves of the same or different sizes may be attached to the walls of the aquarium over one another in order to provide a multi-level effect.

The present invention consists of a shelf unit which is adapted to be removably attached to the inside wall of the aquarium or terrarium. The shelf itself is a rigid planar sheet. It may be formed in a regular shape, such as a square or rectangle, or it may be irregularly shaped, particularly on the sides which are not in contact with the walls of the aquarium when the shelf is in use. The means for attaching the shelf unit may be any device which will provide sufficient strength of attachment and which will be capable of withstanding constant exposure to the aquarium water. It is contemplated that when in use the shelf system of the present invention will provide a support for other aquarium ornamentation. Therefore, the attachment strength must be sufficient so that the attachment is maintained in situations where gravel, plants, rocks, and/or other fish tank ornamentation are placed on the shelf. An example of a suitable attachment means consists of magnets, secured to the shelf in a manner so that opposing magnets may be placed on the outside wall surface of the fish tank glass. Also, hooks, which may suspend the shelves from the top rim of the aquarium provide a suitable means for attaching the shelf to the wall. The preferred means for attachment is one or more suction cups which are attached to the rear and/or side portions of the shelf and then removably attached to the inner glass wall of the aquarium. It is critical that the attaching means does not interfere with the ability of the aquarium to hold water.

To provide additional support for the shelves, particularly when they will be required to hold gravel and other aquarium ornamentation, it is preferable to place columns under the shelves. These columns extend from the bottom of the shelf to the bottom surface of the fish tank. They may be of any length based upon the height of the aquarium, preferably in the range of 1 to 24 inches. The columns may also be used to join different shelves in a multi-level arrangement. The columns may remain free of any attachment to the shelves so that they are held in place merely by the weight of the shelf. Alternatively, the columns may be attached to the bottom of the shelf by any suitable means. A preferred means for attaching the column to the shelf includes an extension from the top of the column which fits into a suitably formed slot in the shelf. Also, the opposite arrangement is possible wherein the extension projects from the bottom of the shelf and this fits into a slot on the top of the column. It is also desirable to provide an expanded base for the column in order to provide a secure support for the shelf.

The shelf of the present invention may also be provided with ornamentation, particularly on the front surface of the shelf. This ornamentation may be formed so that the shelf resembles a rock or stone cliff. Further, the ornamentation may also be formed to resemble wood material or objects generally found under water such as a portion of a ship, chest or barrel. Additionally, the column, if present, may also be provided with suitable ornamentation.

It is preferable if the shelf is formed so that it has a rim or lip around the outer edge. The rim should substantially surround the circumference of the shelf. This is especially desirable in the portion of the shelf that contacts the wall of the aquarium. The lip or rim facilitates the placement of gravel material on the shelf since it prevents the gravel from falling off the shelf. This allows the shelf to be used as a planting bed for aquarium plants. The rim also serves as a suitable surface for providing ornamentation to the shelf, especially in the visible portions such as the front of the shelf and any side of the shelf which does not contact the glass wall of the aquarium.

Conventionally, aerated ornaments or air stones are placed in the aquarium at various locations. The surface floor of the shelf may be provided with slots, holes or other appropriate openings which will allow the passage of air therethrough. The openings prevent air from becoming entrapped under the shelf unit. Trapped air is undesirable since it may cause the shelf to rise in the water and may cause detachment from the wall of the fish tank.

Additionally, it is preferable if the shelf is provided with one or more opened portions in the surface floor of the shelf. The open portions should be of suitable size to allow filter lines, air tubing, heaters and the like to pass therethrough so that they may be placed in the tank without interference from the shelf. It is preferable if the open portions are placed on the shelf in the area which is adjacent to the wall of the aquarium. If the shelf is to be placed in the corner of the fish tank it is preferable if the open portion is formed in the corner of the shelf which contacts the fish tank walls. Additionally, in order to facilitate general use of the aquarium shelf, the open portion may be formed as a knock out or removable section on the shelf floor. In this manner the knock out section may be removed and an open portion may be provided only when it is necessary to suit a particular arrangement in the individual aquarium.

The shelf of the present invention may be formed from any material which will withstand under water exposure. Suitable materials may be wood, metals, rubber and the like. The preferable material for the shelf is plastic such as polypropylene. The plastic may be transparent, or in any color aesthetically pleasing for use in an aquarium. Preferably the shelves are provided with a variegated pattern to simulate rocks or wood. Further, talc may be added to the plastic in order to provide the shelf with a non-buoyant specific gravity. This aids in maintaining the attachment of the shelf. The talc content may range up to 40%. Also, the above mentioned variegated pattern may be accomplished by the use of non-homogenous mixture of thermoplastic material and talc.

DESCRIPTION OF THE DRAWINGS

The above and other objects of and advantages of the present invention will become readily apparent by reference to the following description when considered in conjunction with the accompanying drawings, wherein.

Like references refer to like parts throughout the several views of the drawings.

DETAILED DESCRIPTION OF THE DRAWINGS.

Figure 1:
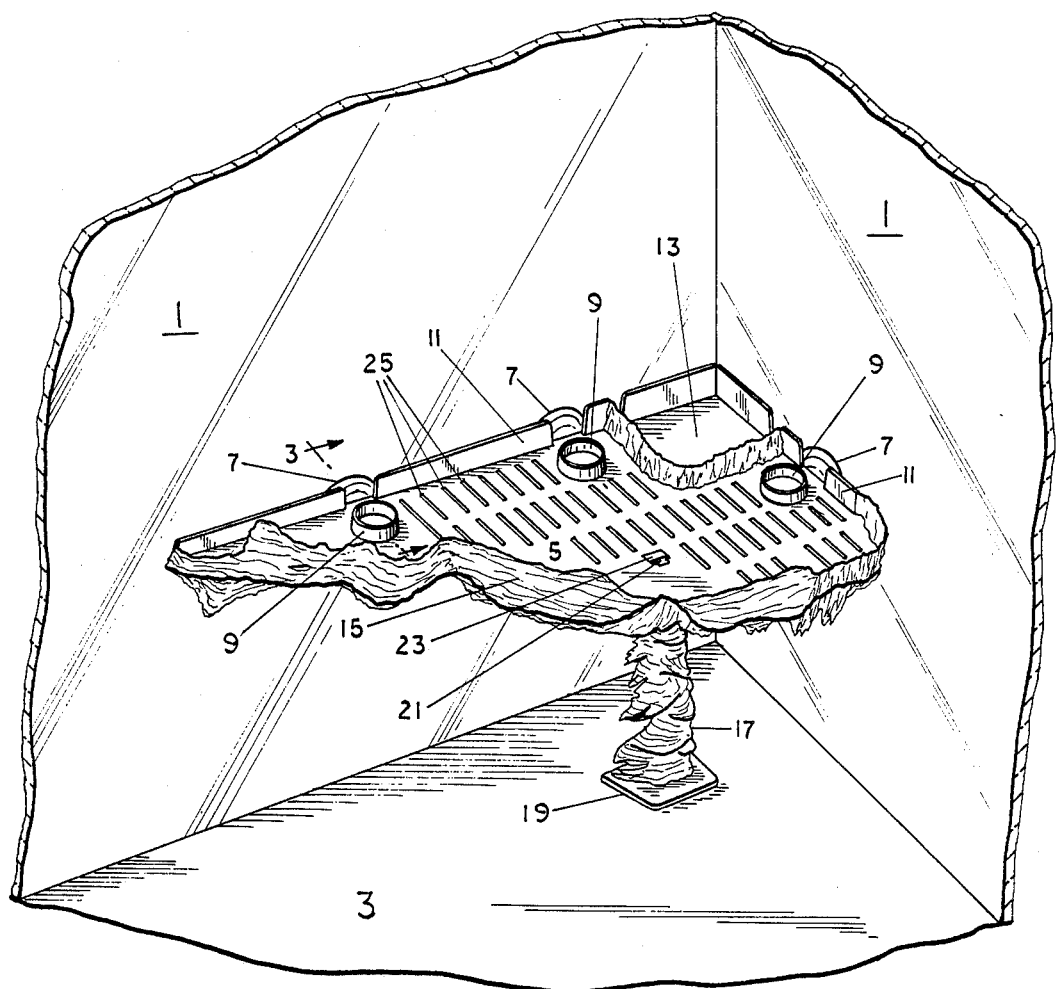
FIG. 1 is a cutaway section of an aquarium showing the preferred embodiment of the present invention and the manner of placement when adapted for the corner of the aquarium.
Figure 2:
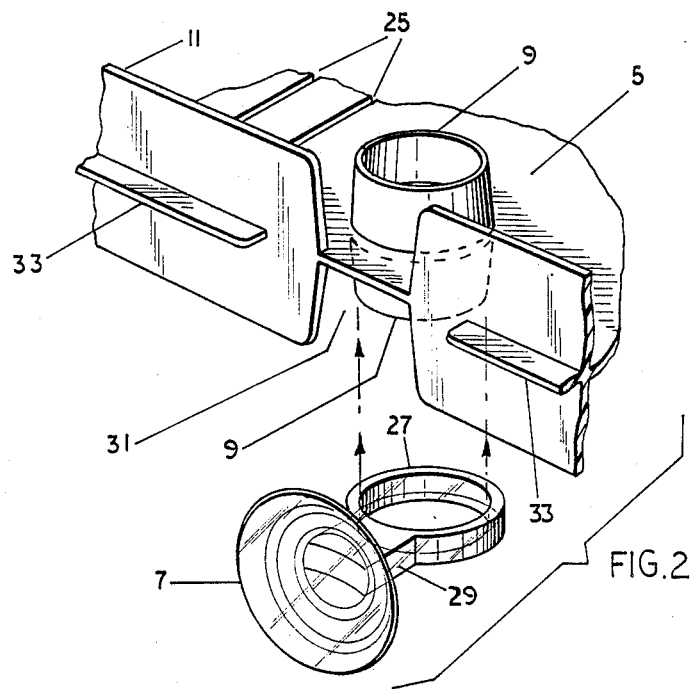
FIG. 2 is a cutaway section of the back or side of the inventive aquarium shelf showing the preferred suction cup means for attachment to the inside of the wall of the aquarium.
Figure 3:
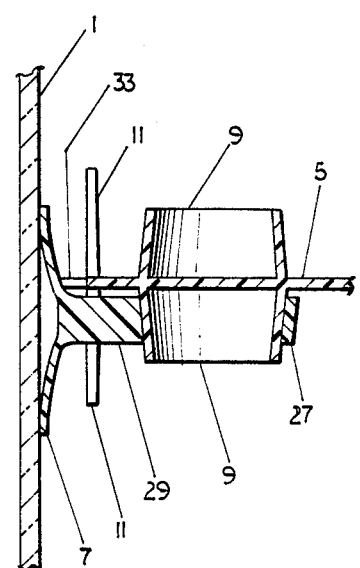
FIG. 3 is a sectional view of the preferred attachment means showing the relationship between the shelf, the suction cup, and the inner surface of the wall of the aquarium.

FIG. 1 illustrates a cutaway view of an aquarium or terrarium tank wherein the glass walls of the tank are designated 1 and the tank bottom 3. The shelf 5 is a rigid planar sheet which is attached to the aquarium walls 1 by a plurality of suction cups 7. Projecting rings 9 are provided on both the top and bottom of the shelf to facilitate the connection of the suction cups to the shelf. (This is illustrated in FIGS. 2 and 3 and the discussion of these figures, infra.). The shelf has a rim 11 on the back wall and the side wall of the shelf which is adjacent to the wall of the aquarium 1. The rim has suitably placed open sections allowing for the connection of the suction cups 7. In the back corner of the shelf, a knock out section 13 is provided. The knockout section 13 may be removed at the option of the user to accommodate air lines, filter tubing and the like. The front and side of the shelf which is visible in use, are provided with a decorative rim 15. In the illustrated embodiment this decorative rim is formed to simulate rock or stone material. The decorative rim 15 extends both above and below the surface of the shelf 5. This facilitates use of the aquarium shelf system in a reversible fashion on either side of the aquarium tank.

The illustrated preferred embodiment of the inventive aquarium shelf is provided with a supporting column 17. The supporting column has a base 19 at the point of contact with the bottom of the aquarium 3. The illustrated column is provided with a decorative texture, on the visible front surface. In the illustrated view the decorative texture is formed to simulate rocks or stones, consistent with the decorative rim 15 of the shelf. The supporting column is attached to to the shelf 5 by the insertion of a projection 21 from the top of the supporting column 17 into a suitable opening 23, in the shelf 5. The shelf 5 is also provided with a plurality of openings on the floor surface thereof, illustrated in the preferred form of slits 25. The slits 25 allow for the passage of air through the shelf to avoid entrapment of the air below the shelf 5.

FIG. 2 illustrates a back or side cutaway portion of the inventive aquarium shelf. This is a portion of the shelf 5 which is adjacent to the aquarium wall 1 and which is not readily visible when the shelf is in place in the aquarium. This figure illustrates the preferred method for connecting the suction cup 7 means of attachment to the shelf 7, by the use of the projecting rings 9. The projecting rings 9 project from the top and bottom of the shelf (to facilitate reversibility) at an open section in the rim 11 of the shelf 5. The suction cup 7 is provided with a suction cup ring 27 of suitable size to securely fit over the projecting ring 9, and thereby connect the suction cup 7 to the shelf 5. In order to provided a suitable connection the suction cup ring 27 is placed over a projecting ring 9 which projects from the bottom of the shelf 5. This is illustrated by the arrows pointing up from the suction cup ring 27 to the projecting ring 9 on the underside of the of the shelf 5. The suction cup 7 and suction cup ring 27 are provided with a connecting bar 29 of a suitable length so that when the suction cup ring 27 is in place over the projecting ring 9 the suction cup may contact the wall of the aquarium 1.

FIG. 2 also illustrates the open section 31 which is provided in the rim 11 of the shelf 5, to allow space for the suction cup projecting bar 29. Further, FIG. 2 illustrates that the rim 11 may extend above and below the surface of the shelf 5 in order to facilitate reversibility of the shelf. A supporting projection 33 may also be provided on the back of the rim 11. The supporting projection 33 provides a contact point between the shelf 5 and the aquarium wall 1 when the shelf is in place attached to the aquarium.

FIG. 3 illustrates the preferred means for attaching the inventive shelf 5 to the wall of the aquarium 1. The suction cup 7 is securely placed against the wall 1 of the aquarium. The suction cup 7 is connected to a suction cup ring 27, by a connecting bar 29 which fits through an opened section in the rim 11 of the shelf 5. The suction cup ring 27 fits over a projecting ring 9 which projects from the underside of the shelf 5. The supporting projection 33 provides a contact point between the the shelf 5 and the inner surface of the wall of the aquarium 1.

It is readily apparent that the above described aquarium shelf meets all of the objectives mentioned as well as providing other advantages for a decorative aquarium ornament. It should be understood that the specific form of the invention here and above described is intended to be representative only, as certain modifications within the scope of these teachings will be apparent to those skilled in the art of aquarium ornamental systems.

Accordingly, reference should be made to the following claims to determine the full scope of the invention.

What is claimed:

1. A shelf system for an aquarium or terrarium comprising:
   (a) a shelf in the form of a rigid planar sheet of a suitable to size to fit inside of an aquarium tank on at least one inside wall surface thereof,
   (b) a means for securely and removably attaching the shelf to the inside wall surface of the aquarium, in a manner so that the attachment does not disrupt the integrity of and does not alter the wall of the aquarium.

2. The shelf system of claim 1, which further comprises a rim surrounding a substantial portion of the outer circumference of the shelf.

3. The shelf system of claim 2, wherein the edges of the shelf which do not contact the aquarium wall, when the shelf is attached to the inner surface of the aquarium wall, are of an irregular shape.

4. The shelf system of claim 3 wherein the rim is provided with a decorative texture.

5. The shelf system of claim 4, wherein the decorative texture is provided only on the portion of the rim which does not contact the aquarium wall when the shelf is removably attached to the inner surface of the aquarium wall.

6. The shelf system of claim 4 wherein the decorative texture is in the form of rocks.

7. The shelf unit of claim 6 wherein the means for attaching the shelf to the aquarium wall comprises one or more suction cups which are connected to the shelf.

8. The shelf unit of claim 7, which further comprises one or more knockout sections which may be removed in order to allow the passage of aquarium tubing therethrough.

9. The shelf system of claim 4, wherein the planar sheet is provided with opening which allow the passage of air therethrough.

10. The shelf system of claim 2, which further comprises a supporting column.

11. The shelf system of claim 10, wherein the supporting column is fastened by a means for attachment to the underside of the shelf.

12. The shelf system of claim 2 wherein the rim is provided with a decorative texture.

13. The shelf system of claim 2 wherein the means for attaching the shelf to the aquarium wall comprises one or more suction cups which are connected to the shelf.

14. The shelf system of claim 1, wherein the edges of the shelf which do not contact the aquarium wall, when the shelf is attached to the inner surface of the aquarium wall, are of an irregular shape.

15. The shelf system of claim 1, wherein the planar sheet is provided with opening which allow the passage of air therethrough.

16. The shelf system of claim 1 wherein the means for attaching the shelf to the aquarium wall comprises one or more suction cups which are connected to the shelf.

17. The shelf unit of claim 1, which further comprises one or more knockout sections which may be removed in order to allow the passage of aquarium tubing therethrough.

18. A shelf system for an aquarium or terrarium which comprises:
   (a) a rigid planar sheet with at least one straight side and at least two irregularly shaped sides, and a plurality of openings through the planar sheet to allow the passage of air therethrough,
   (b) one or more suction cups connected to the shelf and projecting from the straight sides,
   (c) a rim formed around substantially all of the circumference of the shelf, and having an outer surface which is provided with a decorative texture on the portion of the rim surrounding the irregular sides of the shelf;
   (d) a knock out section on the planar sheet which may be removed to form an opening on the planar sheet, and
   (e) a supporting column positioned under the planar sheet.

19. The shelf system of claim 18 wherein the decorative texture is in the form of rocks.

* * * * *